H. S. Hannon,

Manf. White Lead.

No. 4,074. Reissued July 19. 1870.

Witnesses:
Frederic Artos.
Herm. Sauter

Inventor:
Henry S. Hannon
By D. C. Colby.
Attorney

United States Patent Office.

DANIEL C. COLBY, OF WASHINGTON, DISTRICT OF COLUMBIA, AND THOMAS WOODS AND BENJAMIN F. PINE, OF PHILADELPHIA, PENNSYLVANIA, ASSIGNEES OF HENRY S. HANNEN.

*Letters Patent No.* 80,168, *dated July* 21, 1868; *reissue No.* 4,074, *dated July* 19, 1870.

IMPROVEMENT IN THE MANUFACTURE OF WHITE LEAD.

The Schedule referred to in these Letters Patent and making part of the same.

*To whom it may concern:*

Be it known that HENRY S. HANNEN, of Philadelphia, State of Pennsylvania, invented new and useful Improvements in the manufacture of the Carbonate of Lead; and we do hereby declare the following to be a full, clear, and exact description of the same.

One part of this invention consists in regulating and controlling the temperature within the converting-chamber by and through the temperature given to the agents employed to carry on the process of corrosion, and that before the said agents enter the corroding-chamber.

By this method the inconvenience resulting from the uses of heating-coils or pipes, or other extraneous heating-apparatus, in or about the converting-chambers, is avoided, and many other positive advantages gained, as will be fully described and set forth hereinafter.

Another feature of this invention consists in introducing the liquids that are to be sprinkled upon the lead to be converted through a pipe or conduit, arranged to be brought into position at the time, and to be introduced through small openings in the walls of the converting-chamber, and, after each use, withdrawn, said conduit terminating in a fine spraying-nozzle, the object being to have the liquid fall upon the lead in minute particles of spray.

Another improvement is in providing for the introduction of the carbonic-acid gas at or near the bottom of the chamber, so that, by variations of temperature, it may be made to rise or fall in said chamber according to the laws of specific gravity, and for purposes more fully explained hereinafter.

Still another characteristic is the use of chloride and carbonate of soda, or either of these, or their equivalents, within the converting-chamber, during the progress of corrosion, as hereinafter explained.

Of the drawing—

Figure 1:
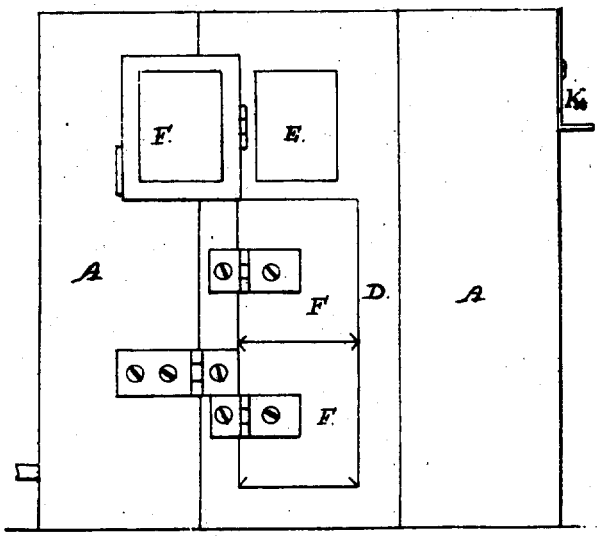
Figure 1 is a front elevation of what may properly be denominated a corroding or converting chamber.
Figure 2:
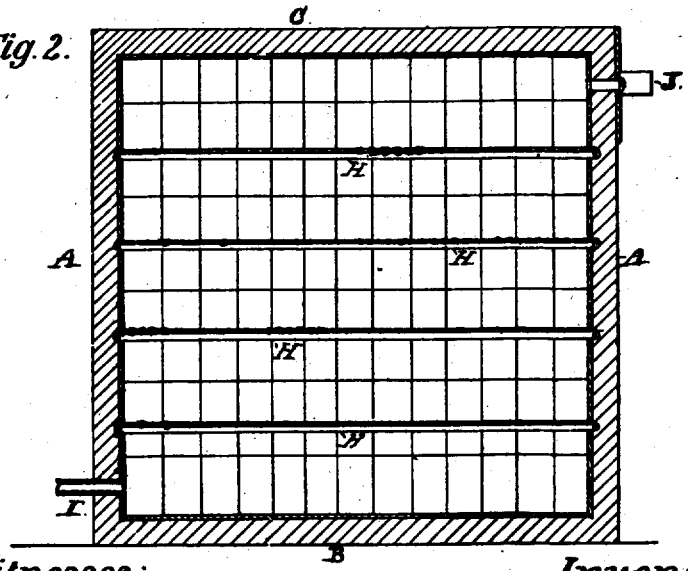
Figure 2 is a sectional elevation of the same.

A A are the vertical walls of the converting-chamber.

B, the bottom thereof.

C, the top or cover.

D, a door of suitable dimensions for a person to pass in and out, and of these there may well be two, one on each of two opposite sides of the chamber.

All these parts should be made of good, well-seasoned pine, and free from all pitch, knots, or defects, put together by tongue and groove, and the chamber, in measurement, ten feet square, or somewhat smaller if preferred.

E, small openings in the door D.

F, covers to the openings E, being hinged to the said door D.

H, a series of slotted or perforated plates or shelves, on which the lead is placed preparatory to the introduction of the corroding agents.

I, the supply tube for the carbonic-acid gas.

J, an opening through which the vapor is carried off.

K, a damper, by which the egress at J may be regulated.

Metallic lead, in the form of scraps or flakes, or otherwise suitably prepared, is placed upon the shelves H, the doors and openings closed, when the treatment is proceeded with, as follows:

Water, impregnated with about one-twentieth of its weight of acetic acid, and heated to 120° or 130° Fahrenheit, is sprinkled evenly over the lead through a pipe or conduit, suitably arranged for being introduced through the openings E for the occasion, and then withdrawn, taking one of these openings E at a time, and going through with all of them in rotation, making use of the eye to determine the extent of spraying required on any shelf or any part thereof. The force for propelling this liquid may be such as most convenient to obtain. The heating or the control of the temperature of this acidulated water may be by having the conduit-tubes pass through a hot-water or hot-air tank connected with the furnace which supplies the conbonic-acid gas, or by other devices when desired.

Having introduced the acidulated water as above described, the temperature in the corroding-chamber, has been raised which should be maintained at about 110° Fahrenheit, as rapidity of conversion and quality of product require. The acetic acid combining with the lead, presents on the surface of the mass a thin film of acetate of lead, and at this stage carbonic-acid gas is introduced, the temperature of which has been previously provided for, so as to keep up the temperature within the chamber to the desired degree. This carbonic-acid gas, now supplied to the chamber in great abundance, as it should be, seizes hold of the acetate of lead and converts it into a carbonate, setting the acetic acid free to attack the raw lead still again, producing more acetate, which, as before, is promptly converted as above into the carbonate, and so on until the contents of the chamber are wholly transformed or converted into a carbonate of lead.

From time to time the mass in the converting-chamber is till further sprinkled with water which has a much larger proportion of acetic acid than that first used.

As it is important to preserve the contents of the chamber from too great a degree of acidity, soda, in the form of the carbonate or chloride, one or both, may be used, the nature of the chlorine principle being to bleach the contents, and secure freedom from the colored spots and yellowish tinge which otherwise often appear, greatly to the injury of the quality of the marketable lead.

These elements of chloride or soda should be introduced in solution, and sprinkled upon the contents of the chambers as is the acetic acid, and, if a tinge or coloring not desirable shall indicate, the chloride of soda may be repeated once a day, or even oftener. If an acid condition only appears, the carbonate of soda will be sufficient, care being taken never to use too much soda, so no excess may remain in the lead to saponify the oil with which the carbonate of lead is afterward ground.

Nothing can exceed the efficiency secured from having the temperature of the carbonic-acid gas, as it enters the converting chamber, perfectly under control, for when an examination shows that the work of conversion is going on more slowly upon the upper shelves of the chamber than the lower ones, the temperature of the carbonic-acid gas as it goes forth to enter said chamber, has only to be raised and the expansion and lesser specific gravity thereof carry it at once to the upper portions of the chamber, to bring forward the work there of which it has been tardy before.

Still further, as sometimes the moisture resulting from the acidulated water from time to time introduced is too great, so that the lead already converted to the carbonate will be moist and clammy to a degree that will prevent the said carbonic-acid gas from penetrating readily to reach the acetate, just forming beneath, instead of hot pipes or contiguous hot-air chambers and a long delay for drying, the ingoing current of the said gas is only to be made hotter, and have the damper K sufficiently open, and the vapor will pass off and the work go on promptly.

The means of controlling the temperature of this gas before and as it enters the chamber may be such as is mentioned for the acidulated water above, or any other that may be most economical and convenient.

Another advantage of this conveying the due amount of heat to the converting-chamber through the agents, being at any time applied, is the distribution and uniformity of heat throughout the chamber, as is not the case with contiguous hot-air chambers or steam or air-pipes.

As by the methods of treatment herein set forth, it is possible at all times to keep a sufficiency of acetic acid, in the liquid form, in intimate contact with the surface of the unconverted lead, and in ever-active presence within the converting-chamber an abundance of carbonic-acid gas, and can supply the needed agents for bleaching and purity, and for securing the neutral conditions of the contents of such chamber, and have always at command the control of the temperature within the same, the work goes on promptly; little or no hydrated oxide is formed, and the product is of the most satisfactory character, a pure carbonate of lead.

What is claimed as the invention of HENRY S. HANNEN, and desired to be secured by Letters Patent, is—

1. Spraying the acetic acid or acidulated water directly upon the lead within the chamber by means of a pipe, introduced, for the time, through the opening E in the doors D, substantially as specified.

2. Securing and maintaining the desired temperature within the corroding-chamber through and by regulating the temperature of the agents employed in the corroding process as they are introduced into said chamber.

3. Subjecting lead, after it has been treated, in a chamber with acetic acid, to the action of carbonic-acid gas, introduced at or near the bottom of the said chamber, for the purposes specified.

4. Subjecting lead, during the progress of its conversion into a carbonate, to the action of a solution of the carbonate of soda or chloride of soda, one or both, for the purposes specified.

DANIEL C. COLBY.
THOMAS WOODS.
BENJ. F. PINE.

Witnesses to signature of COLBY:
J. F. COLBY,
M. E. COLBY.

Witnesses to signatures of WOODS and PINE:
FRANCIS KEYSER,
D. S. WINEBAUER.